Sept. 5, 1961 V. O. ARMSTRONG 2,998,850
HELICOPTER CONTROL APPARATUS
Filed Sept. 9, 1958 2 Sheets-Sheet 1
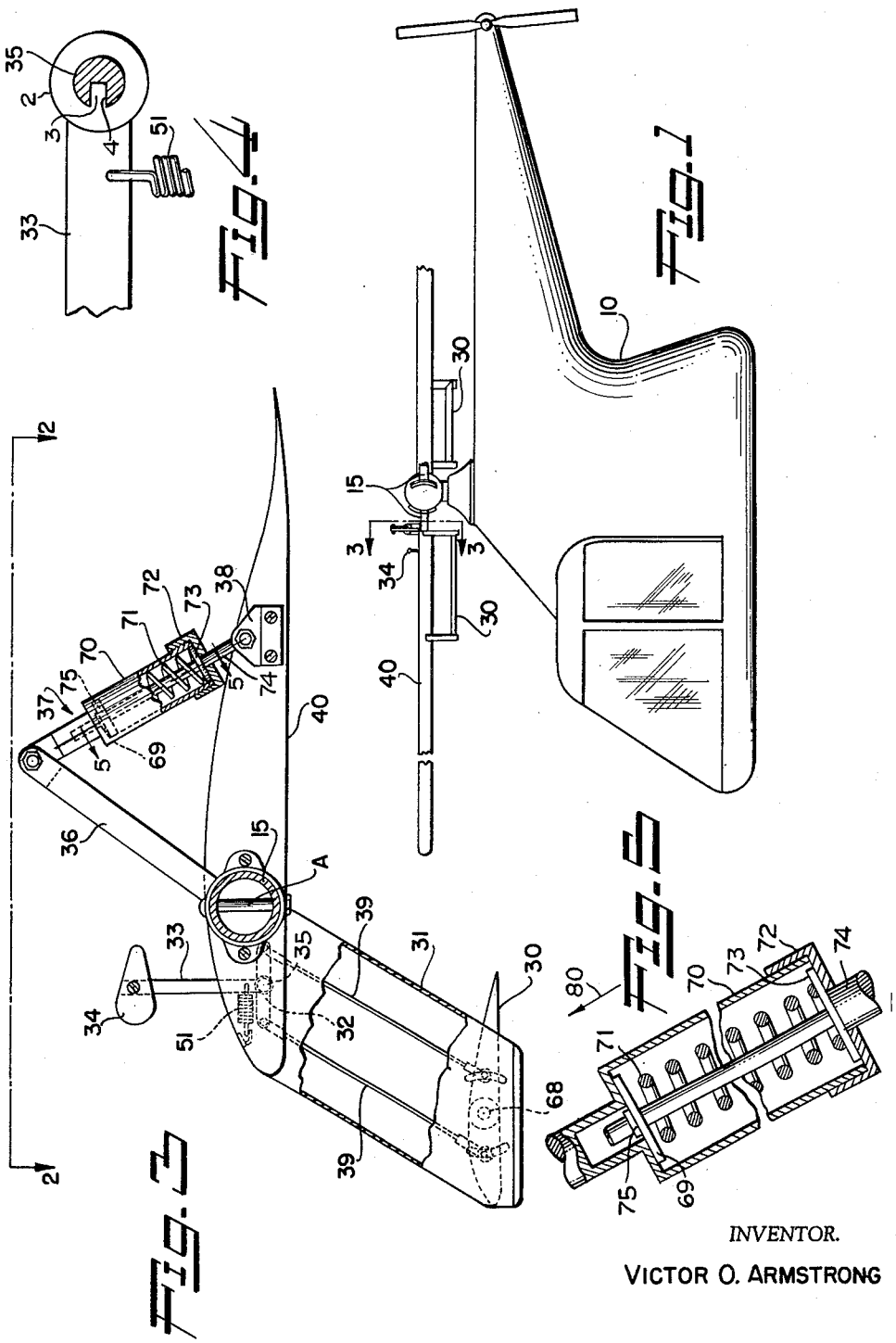
INVENTOR.
VICTOR O. ARMSTRONG

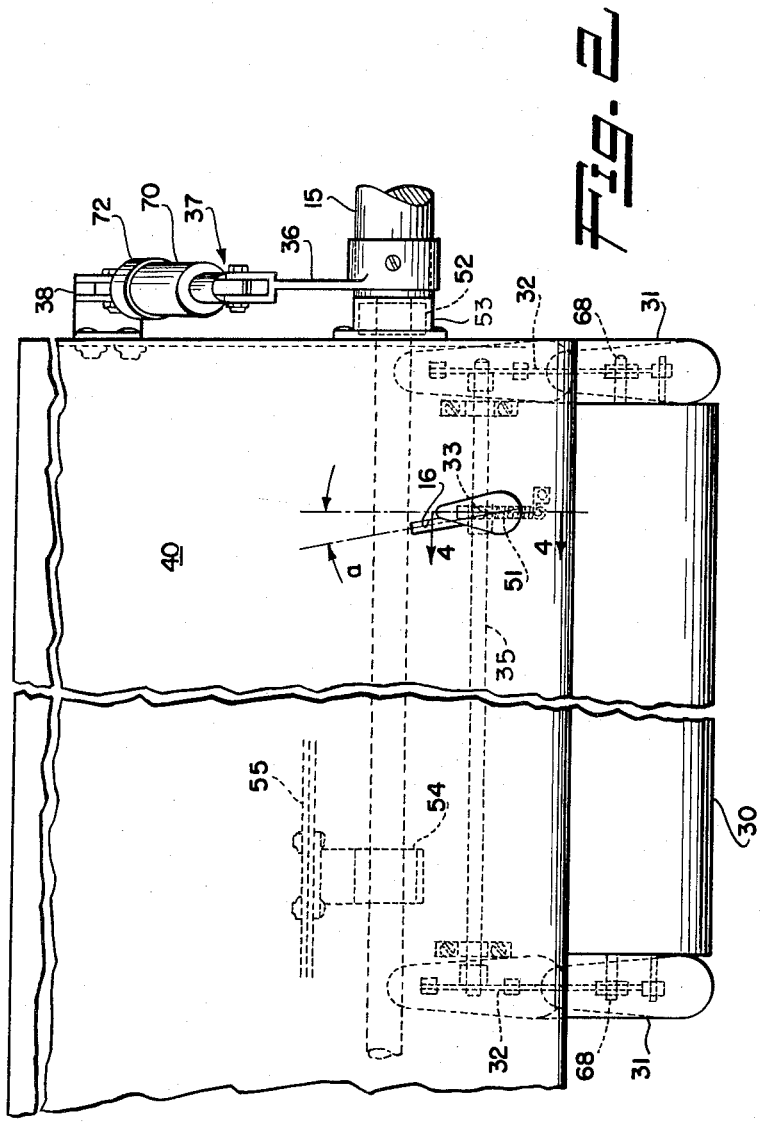

United States Patent Office 2,998,850
Patented Sept. 5, 1961

2,998,850
HELICOPTER CONTROL APPARATUS
Victor O. Armstrong, 13303 Debell St., Pacoima, Calif.
Filed Sept. 9, 1958, Ser. No. 760,009
8 Claims. (Cl. 170—160.16)

This invention relates to helicopters, and more particularly to apparatus for stabilizing and controlling the lifting rotors rotatably carried on helicopters.

This application is a continuation-in-part of my co-pending application Serial No. 520,335, filed July 6, 1955, now United States Patent 2,925,868, issued Fegruary 23, 1960.

Previously designed helicopters have employed a change in cyclic pitch on the rotor blade together with independent flapping hinges to control the lateral and longitudinal motion of the helicopter. Change in the direction of application of the lift vector is generally accomplished by the application of cyclic pitch control.

Difficulties have been encountered when employing helicopter control arrangement in the past which stem largely from the fact that conventional control apparatus is not sensitive to the angle of attack of the rotor blade and conventional controlling apparatus fail to provide means for sensing and obviating the effect of over control of a rotor lifting blade.

The present invention obviates the above difficulties by providing an automatic control for the pitch of the rotor blade. This feature is so designed that in the event of power failure the blades automatically assume a negative angle of attack until sufficient rotor speed is built up to provide lift for the machine. This is considered a safety factor of substantial importance.

An object of the present invention is to provide a helicopter aircraft wherein the rotor is self-stabilizing relative to the aircraft.

Another object of the present invention is to employ a rotor control mechanism wherein the force employed to displace the rotor blade about its longitudinal axis is under control of a pilot airfoil which translates its displacement into rotary movement of the blade about its longitudinal axis.

Additional features of the present invention will become readily apparent upon a reading of the following specification when taken in connection with the drawings wherein:

FIGURE 1 is a side elevational view of a helicopter showing the relative location of the component parts;

FIGURE 2 is a plan view of the automatic control mechanism for the blades angle of attack;

FIGURE 3 is an end view of FIGURE 2;

FIGURE 4 is a sectional view of the means connecting a weight member to the blade taken in the direction of arrows 4—4 of FIGURE 2; and FIGURE 5 is an enlarged sectional view of the double acting spring bungee taken in the direction of arrows 5—5 of FIGURE 3.

FIGURE 1 shows a helicopter composed of a fuselage 10 with provisions for passengers in the forward section. A power control means (not shown) is incorporated in the helicopter for supplying rotary power to the rotor lifting blades 40.

With reference to FIGURE 2, blades 40 are attached to a blade yoke 15 in such a manner that the centrifugal force of rotating blade 40 is dumped into front bearing 52 and bearing support 53 and then into blade yoke 15. Blade 40 is free to rotate about blade yoke 15 and bearings 52 and 54. The loading of bearing 54, a self aligning bearing, is unloaded into blade beam 55.

Pilot airfoil 30 supplies the control moment of the blade which is equal to the lift force of pilot airfoil 30 times the distance to point "A," through structure 31, to regulate the angle of attack of blade 40 (FIGURE 3). Pilot airfoil 30 is controlled by mass 34 which because of centrifugal force is caused to tend to move in a radial direction away from the center of rotation. Mass 34 is placed external to the blade 40 to provide a moment arm for adequate control. Shaft 33 which supports mass 34 is mounted in a slot 16 in the blade upper surface (FIGURE 2) which is affixed at an angle (a) to the blade cord such that a component of the centrifugal force is caused to move mass 34 in a cord-wise direction. Spring 51 is designed such that its rate exactly balances the force exerted on mass 34 at all times. The hub 2 of support 33 is made with a key 3 which is caused to ride in a slot 4 in shaft 35 (FIGURE 4) thereby assuring that shaft 35 rotates through the same angular displacement as bell crank 33 and mass 34. Bell crank 33 is loosely jointed on shaft 35 so that slippage or sliding is permitted. It will be seen that the position of mass 34 is directly controlled by the speed of "A," for the revolutions per minute of the drive shaft. Point "A" rotates with the same speed as blade yoke 15. The rotation of mass 34 causes bell crank 33 to rotate shaft 35. Bell crank 32 is rigidly attached to shaft 35 as mass 34 is rotated around shaft 35, bell crank 32 actuates cable 39 which rotates pilot airfoil 30 about its shaft 68 thereby increasing or decreasing its angle of attack and therefore its lift.

Blade 40 is caused to remain in a fixed position by a double acting spring bungee 37 except when acted on by the moment generated by a pilot air foil 30. Double acting spring bungee 37 is attached to blade 40 by fitting 38 and to blade yoke 15 by bell crank 36 which is bolted to the non-rotating portion of blade yoke 15. Double acting bungee 37 is composed of a housing 70, pistons 69 and 73, pin 75, spring 71, shaft 74 and cap 72. Shaft 74 is so designed with a reduced shank within housing 70 that it can move through piston 73 and piston 69. When shaft 74 moves in the direction of arrow 80, as seen in FIGURE 5, piston 73 compresses spring 71 against piston 69 as the reduced shank of shaft 74 passes through piston 69 and the enlarged portion of the shaft passes housing cap 72. When shaft 74 moves in a direction opposite to the direction of arrow 80, piston 69 will compress spring 71 against piston 73. Pin 75 causes shaft 74, through piston 69, to compress spring 71 when moved in the opposite direction of arrow 80.

An added safety feature exists in this automatic control mechanism. In the event of power failure, point "A" will decrease in velocity. Mass 34, due to forces exerted into spring 51, will decrease the angle of attack of pilot airfoil 30 which through structure 31 with cooperation of bungee 37 will decrease the angle on blade 40. When sufficient blade rotational speed has been built up, mass 34 will increase the angle of attack of pilot airfoil 30 which through structure 31 will cause blades 40 to again assume a positive angle of attack. This cycle will continue until the helicopter reaches the ground.

Various modifications of the present invention may be made by those skilled in the art without departing from the spirit and scope of the invention as hereinafter defined by the appended claims.

What is claimed is:

1. In a helicopter control arrangement for controlling the flight of a helicopter, in combination with a lifting rotor blade rotatably carried on the helicopter, a pilot airfoil pivotally secured in spaced relationship to the blade positionable to alter the blade plane of rotation to modify the aerodynamic lift forces developed on the blade, the pilot airfoil having a leading edge maintained forward of the rotor blade to directly meet oncoming airflow, a parallelogram linkage operably connected between the blade and the airfoil to pivot the airfoil, a weight located exteriorly of the blade connected to the linkage and effective to change the angle of attack of the airfoil leading edge with respect to oncoming airflow via the linkage responsive to a change of the blade from a given angle of attack plane whereby the flow of air past the airfoil is altered which aerodynamically rotates the blade about its longitudinal axis.

2. In a helicopter control arrangement for controlling the flight of a helicopter, in combination with a lifting rotor blade carried on the helicopter and rotatable about a longitudinal axis, a pilot airfoil for controlling blade rotation, the pilot airfoil having a leading edge maintained forward of the rotor blade to directly meet oncoming airflow, parallel structural members secured to the blade pivotally supporting the airfoil in spaced relationship to the blade, control linkage pivotally supported on the blade and operably connecting the airfoil to pivot the airfoil, and a weight disposed exteriorly of the blade and carried on the linkage adapted to pivot the linkage responsive to blade rotation about its longitudinal axis to change the angle of attack of the airfoil which alters the flow of oncoming air past the airfoil and aerodynamically causes the blade to rotate about its longitudinal axis in accordance therewith.

3. The invention as described in claim 2 including biasing means resiliently connecting the weight to the blade for normally decreasing the angle of attack of the pilot airfoil.

4. In a helicopter control arrangement for controlling the flight of a helicopter, in combination with the lifting rotor blade of the helicopter, an airfoil for controlling the rotation of the blade to present a selected angle of attack, the pilot airfoil having a leading edge maintained forward of the rotor blade to directly meet oncoming airflow, parallel structural members pivotally supporting the airfoil from the blade and below the blade in spaced relationship, parallelogram control linkage pivotally connected between the blade and the airfoil, a weighted member located exteriorly of the blade and fixed to the linkage and positionable from a relatively stationary position responsive to a change of the blade from a given angle of attack so that the airfoil pivots via the linkage to modify its angle of attack with respect to the oncoming air stream whereby the blade plane is aerodynamically altered to resume its given angle.

5. In a helicopter control arrangement for controlling the flight of a helicopter, in combination with the lifting rotor blade of the helicopter, an airfoil for controlling the blade to present a selected angle of attack, parallel structural members pivotally supporting the airfoil below and in spaced relationship from the blade and for transmitting load forces from the airfoil to the blade, the pilot airfoil having a leading edge maintained forward of the rotor blade to directly meet oncoming airflow, parallelogram control linkage pivotally connected between the blade and the airfoil, the blade having a slot at an angle to the blade cord, a weighted member fixed to the linkage projecting through the slot exteriorly of the blade projecting into the oncoming air stream so that the centrifugal force of blade rotation causes the weighted member to move in a cordwise direction, spring biasing means connecting the weighted member to the blade for normally decreasing the angle of attack of the airfoil, the weighted member positionable cordwise from a first position responsive to a change of the blade from a predetermined position to alter the angle of attack of the airfoil via the linkage so that the load placed on the airfoil is transmitted to the blade via the structural members so that the blade assumes its predetermined plane, and a double acting spring bungee acting on the blade against the forces acting on the blade through the airfoil so that the blade tends to remain in a fixed position.

6. In a helicopter control arrangement for controlling the flight of a helicopter, in combination with a lifting rotor blade rotatably carried on the helicopter, a pilot airfoil secured below and in spaced relationship to the blade positionable about a longitudinal axis for controlling the angle of attack of the blade, the pilot airfoil having a leading edge maintained forward of the rotor blade to directly meet oncoming airflow, a parallelogram control linkage pivotally supported on the blade and operably connected to the airfoil to position the airfoil, a weight operably connected to the linkage to position the airfoil to increase and decrease the angle of attack responsive to the rotation of the blade, parallel structural members pivotally mounting the airfoil below the blade which transmits the angle of attack of the airfoil to the blade, and the blade having a slot at an angle to the blade cord through which the weight projects exteriorly of the blade into the oncoming airstream so that the centrifugal force generated by the rotation of the blade causes the weight to move in a cord-wise direction.

7. The invention as defined in claim 6 wherein the positioning of the airfoil by the weight via linkage is responsive to change of speed of blade rotations.

8. In a helicopter control arrangement for controlling the flight of a helicopter, in combination with a lifting rotor blade rotatably carried on the helicopter, a pilot airfoil secured below and in spaced relationship to the blade positionable about a longitudinal axis for controlling the angle of attack of the blade, the pilot airfoil having a leading edge maintained forward of the rotor blade to directly meet oncoming airflow, a parallelogram control linkage pivotally supported on the blade and operably connected to the airfoil to position the airfoil, a weight operably connected to the linkage to position the airfoil to increase and decrease its angle of attack responsive to the rotation of the blade, parallel structural members pivotally mounting the airfoil below the blade which transmits the angle of attack of the airfoil to the blade, the blade having a slot at an angle to the blade cord through which the weight projects exteriorly of the blade into the oncoming airstream so that the centrifugal force generated by the rotation of the blade causes the weight to move in a cord-wise direction, and spring biasing means active on the blade against the transmission of the angle of attack of the airfoil to the blade so that the blade tends to remain in a fixed position.

References Cited in the file of this patent

UNITED STATES PATENTS

| Re. 18,957 | Gobereau et al. | Sept. 26, 1933 |
| 1,909,450 | Bleecker | May 16, 1933 |
| 1,986,709 | Breguet et al. | Jan. 1, 1935 |
| 2,082,674 | Young | June 1, 1937 |
| 2,455,866 | Kaman | Dec. 7, 1948 |
| 2,614,637 | Landgraf | Oct. 21, 1952 |
| 2,625,997 | Doak | Jan. 20, 1953 |
| 2,892,502 | Donovan | June 30, 1959 |